Oct. 29, 1940.    C. W. NOFSINGER    2,220,020
TREATMENT OF HYDROCARBON OIL
Filed Oct. 27, 1937
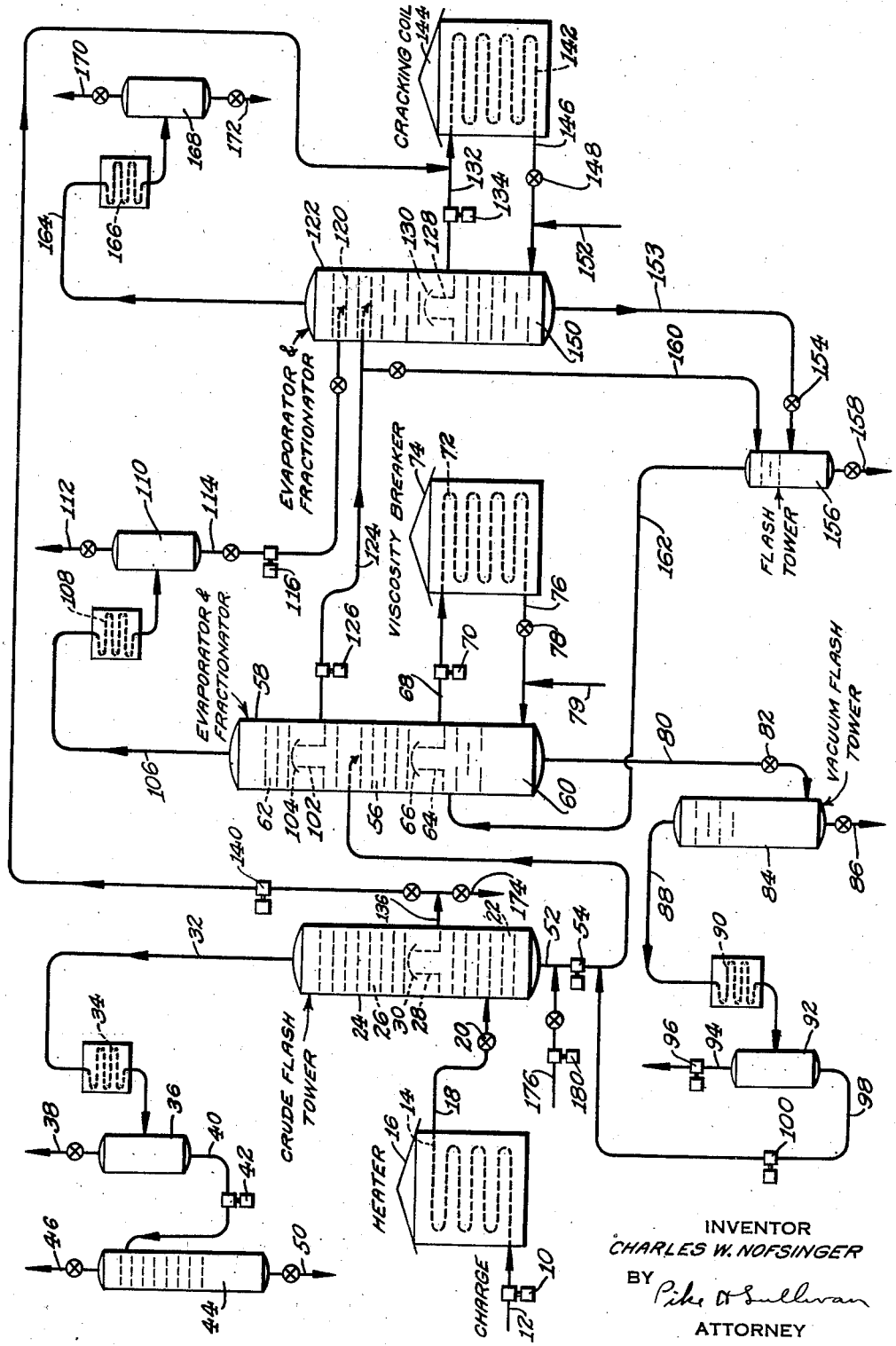
INVENTOR
CHARLES W. NOFSINGER
BY
ATTORNEY Patented Oct. 29, 1940

2,220,020

UNITED STATES PATENT OFFICE 2,220,020

TREATMENT OF HYDROCARBON OIL

Charles W. Nofsinger, Summit, N. J., assignor to Gasoline Products Company Inc., Newark, N. J., a corporation of Delaware Application October 27, 1937, Serial No. 171,229

6 Claims. (Cl. 196—48)

This invention relates to improvements in the art of converting higher boiling hydrocarbons into lower boiling hydrocarbons.

In one form of the invention relatively heavy oil such as crude petroleum oil, preferably preheated to a distilling temperature is fractionally distilled to separate overhead distillate from reflux condensate and from residual oil such as reduced crude oil. Other fractions may also be separated during the fractionation of the crude oil. The overhead distillate is preferably treated to remove volatile undesirable constituents to form a depropanized straight run gasoline. The reflux condensate is preferably combined with oil stock to be cracked and passed through a cracking zone or coil under high crack per pass conditions.

The residual oil is introduced into a fractionating zone where it contacts hot vapors and some of the lighter constituents of the residual oil are removed. The unvaporized portions of the residual oil and heavy reflux condensate are passed under mild cracking conditions through a viscosity breaking zone or coil to produce a relatively large yield of gas oil constituents and a relatively low yield of gasoline constituents, the gas oil constituents being suitable for further cracking under drastic conditions to produce a relatively high yield of gasoline constituents.

The products from the viscosity breaking zone or coil are passed to an evaporator to separate vapors from liquid residue, the liquid residue being passed to a vacuum flash tower to further separate vapors from liquid residue such as a low gravity fuel oil, the vapors being condensed and the heavy flash distillate being combined with the residual oil or reduced crude oil passing to the fractionating zone. The vapors separated in the evaporator are passed to the fractionating zone wherein they are fractionated and contact with the introduced residual oil. The vapors remaining after contact with the residual oil are further fractionated to separate a light reflux condensate from overhead distillate. The overhead distillate is introduced into the top portion of a second fractionating zone as reflux, and the light reflux condensate is passed to the second fractionating zone at a point lower than the point of introduction of the overhead distillate where it contacts hot vapors and the lighter constituents thereof are vaporized.

The unvaporized portions of the light reflux condensate are combined with the reflux condensate from the fractionation of the heavy charge oil and the combined stream passed through a cracking zone or coil wherein the oil is maintained under superatmospheric pressure and high temperature conditions to effect the desired extent of cracking. The products leaving the cracking zone are passed to a second evaporator for separation into vapors and liquid residue, the vapors being supplied to the second fractionating zone for fractionation therein. The liquid residue is passed to a flash tower to separate vapors from liquid residue such as fuel oil, the vapors being passed to the first mentioned evaporator associated with the viscosity breaking zone.

The overhead vapors from the second fractionating zone are condensed to form a distillate such as gasoline which may be passed through a stabilizer, if desired, to remove volatile constituents undesirable in a motor fuel.

Having given a general statement of the object and nature of the invention, a further detailed description will now be given in which reference will be made to the drawing which represents a diagrammatic showing of apparatus suitable for practicing the process of the invention.

In the drawing the reference character 10 designates a pump for forcing heavy charging oil through line 12 and through a preheating coil 14 in heater 16 for preheating the oil charge to a distilling temperature. The preheated oil charge leaves the preheating coil 14 through line 18 which may have a pressure reducing valve 20 and is passed into the lower portion 22 of a crude flash tower 24 wherein it is fractionally distilled to separate reflux condensate, such as gas oil, from light overhead vapors and residual oil.

The flash tower 24 has a fractionating section 26 at the bottom of which is positioned a trapout tray 28 provided with a hood 30 for collecting the reflux condensate. The vapors from the bottom portion 22 of the crude flash tower 24 are fractionated in the fractionating section 26 and the light vapors pass overhead through line 32 and are condensed by passing through condenser 34 to form a light distillate product which is collected in receiver 36 having a valved gas outlet 38. The distillate is withdrawn from the receiver 36 and passed through line 40 by pump 42 into the top portion of a depropanizer 44 in order to obtain a straight run gasoline having objectionable volatile constituents removed therefrom. The straight run gasoline may be sent to storage. The depropanizer is provided with a valved gas outlet 46 and a valved liquid outlet 50.

The residual oil which collects on the bottom of the crude flash tower 24 is withdrawn and passed through line 52 by pump 54 into a fractionating section 56 of a low pressure combined evaporator and fractionating tower 58. The combined evaporator and fractionating tower 58 is provided with an evaporator or separating zone 60 and another fractionating section 62 which receives vapors from the first fractionating section 56. Separating the evaporator or separating zone 60 from the fractionating section 56 is a trapout tray 64 provided with a hood 66.

The residual oil introduced into the fractionating section 56 contacts hot vapors therein and a part of the residual oil is vaporized and some of the vapors are condensed to form heavy reflux condensate. The unvaporized portions of the residual oil and heavy reflux condensate are withdrawn from the trapout tray 64 and passed through line 68 by pump 70 through a viscosity breaking zone or coil 72 in heater 74 wherein the oil is maintained under mild cracking conditions to produce a relatively high yield of gas oil constituents which are suitable for further cracking into gasoline. The products leaving the viscosity breaking zone or coil 72 are passed through line 76 having a pressure reducing valve 78 into the evaporator or separating zone 60 of the combined evaporator and fractionating tower 58 wherein vapors are separated from liquid residue. If desired, a quench oil may be introduced into the cracked products through line 79.

The liquid residue is withdrawn from the bottom of the evaporator or separating zone 60 and is passed through line 80 having a pressure reducing valve 82 into a vacuum flash tower 84 maintained under sub-atmospheric pressure wherein a separation into vapors and liquid residue occurs. The liquid residue is a fuel oil having a low gravity and is withdrawn from the vacuum flash tower 84 through line 86. The separated vapors leave the top of the vacuum flash tower through line 88 and are passed through condenser 90 to form a heavy flash distillate which is collected in receiver 92 having a gas outlet 94. A pump 96 is provided for outlet line 94 in order to maintain the necessary low pressure on the vacuum flash tower but it is to be understood that other means may be used such as a barometric condenser. By using a vacuum flash tower, heavy constituents are removed from the fuel oil withdrawn from the bottom of evaporator 60 which are returned for further cracking in viscosity breaking zone 72 to produce additional quantities of gas oil constituents convertible into gasoline constituents.

The heavy flash distillate is withdrawn from receiver 92 and passed through line 98 by pump 100 and is preferably combined with the residual oil passing through line 52 which is introduced into the top portion of the fractionating section 56 of the combined evaporator and fractionating tower 58. Or the flash distillate may be separately introduced into the fractionating section 56. The flash distillate contacts hot vapors in the fractionating section 56 and some of the lighter constituents thereof are vaporized. The unvaporized portions of the flash distillate are combined with the heavy oil collecting on trapout tray 64 and charged to the viscosity breaking zone or coil 72 for further conversion.

The vapors from fractionating section 56 are passed to the fractionating section 62 of the combined evaporator and fractionating tower 58 wherein they are further fractionated to separate a light reflux condensate from lighter vapors. The light reflux condensate is collected in the combined evaporator and fractionating tower 58 on trapout tray 102 having a hood 104. The vapors leave the top of the fractionating section 62 through line 106 and are condensed by passing through condenser 108 to form a distillate which is collected in receiver 110 having a valved gas outlet 112. The distillate is withdrawn from the receiver 110 and passed through valved line 114 by pump 116 into the fractionating section 120 of a high pressure evaporator and fractionating tower 122 as reflux.

The light reflux condensate which collects on the trapout tray 102 in the low pressure combined evaporator and fractionating tower 58 contains gas oil constituents and is passed through line 124 by pump 126 into the fractionating section 120 of the high pressure combined evaporator and fractionating tower 122. The light reflux condensate is introduced into the fractionating section 120 at a point lower than the point of introduction of the distillate which is passed through line 114.

The introduced light reflux condensate and light distillate contact hot vapors in the high pressure combined evaporator and fractionating tower 122 and light constituents thereof are vaporized and some of the vapors are condensed to form condensate oil which is collected on trapout tray 128 having a hood 130, the tray 128 being located at the bottom of the fractionating section 120. Any unvaporized portions of the light reflux condensate and light distillate will be collected on trapout tray 128 and be combined with the condensate oil.

The condensate oil and any unvaporized portions of introduced light reflux condensate and light distillate are withdrawn from trapout tray 128 and passed through line 132 by pump 134 and preferably combined with reflux condensate, such as gas oil, derived from the fractional distillation of the petroleum oil in crude flash tower 24 which collects on trapout tray 28. The reflux condensate is withdrawn from trapout tray 28 and passed through line 136 by pump 140. The combined stream is passed through the cracking zone or coil 142 in heater 144 wherein it is subjected to a high rate of cracking per pass to effect conversion into gasoline constituents of high anti-knock value. The products leave the cracking zone or coil 142 through line 146 having a pressure reducing valve 148 into the evaporator or separating zone 150 of the high pressure combined evaporator and fractionating tower 122 wherein a separation into vapors and liquid residue occurs. If desired, a quench oil may be introduced into the stream of cracked products through line 152.

The liquid residue is withdrawn from the bottom of the evaporator or separating zone 150 through line 153 having a pressure reducing valve 154 into a fuel oil flash tower 156 wherein a further separation into vapors and liquid residue occurs. The liquid residue is a fuel oil which is withdrawn through line 158. A part of the reflux condensate from trapout tray 102 in the combined low pressure evaporator and fractionating tower 58 is preferably passed through line 160 into the top portion of the flash tower 156 as reflux. The vapors leave the top of the flash tower 156 through line 162 and are introduced into the evaporator or separating zone 60 of the low pressure combined evaporator and fractionating tower 58 wherein they mix with hot vapors and pass to the fractionating section 56, any heavy constituents being condensed and passed to the vacuum flash tower 84.

The vapors from the evaporator or separating zone 150 of the high pressure combined evaporator and fractionating tower 122 pass upwardly into the fractionating section 120 where they contact the reflux condensate introduced through line 124 and the light distillate introduced through line 114 as before mentioned. The remaining vapors leave the top of the fractionating section 120 through line 164 and are passed through condenser 166 to form a distillate which is collected in receiver 168 having a valved gas outlet 170 and a valved liquid outlet 172. The distillate is a light motor fuel having the desired boiling range which may be treated in a stabilizer to produce a stabilized gasoline, if desired.

A portion of the reflux condensate collecting on trapout tray 28 and withdrawn through line 136 may be withdrawn as a separate product through valved line 174.

In some instances it may be desirable to add reduced crude oil or other heavy oil from storage to the residual oil passing through line 52 and in those cases heavy oil may be introduced through line 176 by pump 180.

As a modification of my invention the gas oil from trapout tray 28, instead of being passed through cracking coil or zone 142, may be passed through a separate cracking zone or coil to effect the desired extent of cracking thereof, and may then be passed to the evaporator 150 for separation into vapors and liquid residue.

A typical operation contemplated by this invention will now be given but it is to be expressly understood that the invention is not restricted thereto. A heavy charging oil is preheated to a distilling temperature of about 550 to 650° F. by being passed through heating coil or zone 14. During this heating the heavy charging oil may be under pressure. For example, the preheated oil preferably leaves the heating zone or coil 14 at a temperature of about 625° F. and under a pressure of about 35 pounds per square inch. The preheated heavy charging oil is introduced into the crude flash tower 24 where it is fractionally distilled to separate residual oil from reflux condensate and light distillate. The light distillate is preferably passed through the depropanizer 44 which is maintained under a pressure of about 44 pounds per square inch and in this way a depropanized straight run gasoline is obtained.

The crude flash tower is maintained under a pressure of about atmospheric to 50 pounds per square inch, preferably about 15 pounds per square inch. The residual oil is introduced into the fractionating section 56 of the combined low pressure evaporator and fractionating tower 58 which is maintained under a pressure of about 25 to 75 pounds per square inch, preferably about 50 pounds per square inch. The residual oil contacts hot vapors from the evaporator or separating zone 60 and in this way some of the vapors are condensed to form heavy reflux condensate and some of the residual oil is vaporized. The unvaporized portions of the residual oil and the heavy reflux condensate are passed through the viscosity breaking zone or coil 72 wherein the oil is maintained under a pressure of about 50 to 400 pounds per square inch and at a temperature of about 825 to 925° F. The products leave the viscosity breaking zone or coil 72, for example, at a temperature of about 885° F. and under a pressure of about 200 pounds per square inch.

In the evaporator or separating zone 60 the cracked products are separated into vapors and liquid residue, the liquid residue being directed to the vacuum flash tower 84 which is maintained under a sub-atmospheric pressure of about 90 mm. of mercury. By passing the liquid residue into the vacuum flash tower, a fuel oil having a low gravity is obtained and at the same time the maximum yield possible of heavy constituents is obtained which heavy constituents are further cracked by recycling through viscosity breaking zone or coil 72 to produce additional quantities of gas oil constituents suitable for conversion into gasoline constituents. The heavy flash distillate from the vacuum flash tower 84 may be combined with the residual oil from the bottom of the crude flash tower 24, the combined stream being introduced into the fractionating section 56 of the low pressure combined evaporator and fractionating tower 58. The heavy constituents separated from the heavy flash distillate will be collected on the trapout tray 64 and will be recycled through the viscosity breaking zone or coil 72.

The vapors from the evaporator or separating zone 60 of the low pressure combined evaporator and fractionating tower 58 are further fractionated in the fractionating section 62 to separate light reflux condensate from a relatively light distillate. The distillate is introduced into the top portion of the fractionating section 120 of the high pressure combined evaporator and fractionating tower 122. The light reflux condensate is also introduced into the fractionating section 120 at a lower point than the point of introduction of the relatively light distillate as fresh feed for the cracking zone or coil 142.

Condensate oil together with any gas oil constituents separated from the light reflux condensate which collects on trapout tray 128 in the high pressure combined evaporator and fractionating tower 122 is withdrawn and preferably combined with reflux condensate withdrawn from trapout tray 28 of the crude flash tower 24 and the combined stream is passed through cracking zone or coil 142 wherein it is maintained under a pressure of about 200 to 1000 pounds per square inch and at a temperature of about 925 to 1050° F. in order to effect the desired extent of cracking. The products leave the cracking zone or coil 142, for example, at a temperature of about 980° F. and under pressure of about 740 pounds per square inch.

The cracked products from the cracking zone or coil 142 are introduced into the evaporator or separating zone 150 wherein a separation into vapors and liquid residue occurs, the vapors passing upwardly into the fractionating section 120 where they contact reflux condensate introduced through line 124 and light distillate introduced through line 114. In this fractionation some of the vapors are condensed to form reflux condensate and light constituents of the introduced oils are vaporized, the unvaporized portions of the introduced oils and the reflux condensate forming the condensate oil which is passed through the cracking zone or coil 142 as above described.

The high pressure combined evaporator and fractionating tower 122 is maintained under a pressure of about 100 to 400 pounds per square inch, preferably about 250 pounds per square inch.

The liquid residue from the bottom of the evaporator or separating zone 150 is passed to the fuel oil flash tower 156 which is preferably maintained under a pressure of about 50 pounds per square inch. The vapors from the flash tower 156 are introduced into the top portion of the evaporator or separating zone 60 of the combined low pressure evaporator and fractionating tower 58 and mixed with the vapors therein to be passed to the fractionating section 56. The bulk of the flashed vapors from flash tower 156 will be condensed and collected on trapout trays 64 and 162 in the low pressure evaporator and fractionating tower 58. Any heavier constituents will pass out with the residue through line 80 to be passed to the vacuum flash tower 84 wherein a heavy flash distillate is separated from a heavy fuel oil as above described.

In carrying out my process East Texas crude oil has been used as a crude charging stock. The East Texas crude used had a gravity of 38.7 A. P. I. and on distillation gave the following readings:

| | °F. |
|---|---|
| Initial boiling point | 122 |
| 20% | 290 |
| 50% | 594 |
| 60% | 650 |

In practice the fuel oil from the vacuum flash tower 84 has been reduced to a gravity of about 8 to 10° A. P. I. The heavy flash distillate from receiver 92 has a gravity of about 20.7 A. P. I. and on distillation gave the following readings:

| | °F. |
|---|---|
| Initial boiling point | 321 |
| 10% | 639 |
| 20% | 682 |

My invention is not to be restricted to the types of oils and conditions given in the preceding paragraph as they are given only by way of example. Different oils may be used and the conditions changed to give the desired results.

While one embodiment of my invention has been described it is to be expressly understood that my invention is not restricted thereto, and various modifications and adaptations thereof may be made without departing from the spirit of the invention.

I claim:

1. A process for converting higher boiling hydrocarbons into lower boiling hydrocarbons which comprises distilling crude petroleum to separate vapors from residue and fractionating the separated vapors to form a condensate, introducing resultant residue into contact with vapors in a fractionating zone wherein fractionation takes place, passing resultant admixed heavy reflux condensate and unvaporized residue to a viscosity-breaking zone wherein the oil is subjected to cracking temperature and superatmospheric pressure under viscosity-breaking conditions to effect conversion into a relatively high yield of gas oil constituents adapted for conversion into gasoline, directing the resultant viscosity-broken products into a separating zone wherein vapors separate from residue, passing the separated vapors into said fractionating zone for contact with said introduced residue and for fractionating the vapors to form a lighter condensate, passing resultant residue from said separating zone to a vacuum flashing zone wherein the residue is subjected to distillation under sub-atmospheric pressure to form a heavy vacuum flashed distillate, introducing resultant heavy vacuum flashed distillate into said fractionating zone so that at least the heavier constituents thereof will be combined with the admixed heavy reflux condensate and unvaporized residue passed to the viscosity-breaking zone, introducing resultant lighter condensate from said fractionating zone into contact with vapors in a second fractionating zone wherein fractionation takes place to form a reflux condensate and a desired distillate product and wherein at least a portion of the constituents of the introduced lighter condensate is combined with said reflux condensate to form a part thereof, combining said reflux condensate with aforesaid condensate obtained from the crude petroleum and passing the mixture to a cracking zone wherein it is subjected to cracking conditions of temperature and pressure to effect conversion into gasoline constituents, directing the resultant cracked products to a second separating zone wherein vapors separate from residue, and passing the separated vapors to said second fractionating zone for fractionation therein.

2. A process for converting higher boiling hydrocarbons into lower boiling hydrocarbons which comprises fractionally distilling crude petroleum to separate residual oil from reflux condensate, passing residual oil so obtained to a fractionating zone wherein it contacts vapors and some of the residual oil is vaporized and some of the vapors are condensed to form heavy reflux condensate, passing unvaporized portions of the residual oil and heavy reflux condensate to a viscosity breaking zone wherein they are subjected to cracking temperature and superatmospheric pressure under viscosity-breaking conditions to produce a relatively high yield of gas oil constituents suitable for conversion into gasoline, directing the viscosity-broken products into a separating zone to separate vapors from liquid residue, passing the separated vapors into said fractionating zone for contact with the introduced residual oil and subjecting the vapors to further fractionation to separate a lighter condensate therefrom, introducing resultant lighter condensate to a second fractionating zone wherein it contacts hot vapors and a portion of the lighter condensate is vaporized and a portion of the vapors is condensed to form reflux condensate, combining unvaporized portions of the lighter condensate and the last mentioned reflux condensate with reflux condensate separated during the fractional distillation of the crude petroleum, passing the combined stream through a cracking zone wherein it is maintained under superatmospheric pressure and high temperature conditions to effect the desired extent of cracking thereof, passing the products from said cracking zone to a second separating zone to separate vapors from residue, passing the last mentioned vapors to said second fractionating zone for contact with the lighter condensate introduced thereinto, passing liquid residue from said first mentioned separating zone to a flashing zone under reduced pressure to separate a relatively heavy fuel oil from heavy flash distillate, and directing the heavy flash distillate to said first mentioned fractionating zone for contact with hot vapors therein to vaporize a part thereof, the unvaporized part thereof being passed through said viscosity-breaking zone for further treatment along with unvaporized portions of the residual oil and heavy reflux condensate.

3. A process for converting higher boiling hydrocarbons into lower boiling hydrocarbons which comprises passing reduced crude oil to a fractionating zone wherein it contacts vapors and some of the oil is vaporized and some of the vapors are condensed to form heavy reflux condensate, passing unvaporized portions of the reduced crude oil and heavy reflux condensate to a viscosity-breaking zone wherein they are subjected to cracking temperature and superatmospheric pressure under viscosity-breaking conditions to produce a relatively high yield of gas oil constituents suitable for conversion into gasoline, directing the viscosity-broken products into a separating zone to separate vapors from liquid residue, passing the separated vapors into said fractionating zone for contact with the introduced reduced crude oil and subjecting the vapors to further fractionation to separate a lighter condensate therefrom, introducing resultant lighter condensate so obtained to a second fractionating zone wherein it contacts hot vapors and a part of the lighter condensate is vaporized and some of the vapors are condensed to form reflux condensate, combining unvaporized portions of the lighter condensate and the last mentioned reflux condensate, passing the combined stream to a cracking zone wherein it is maintained under superatmospheric pressure and high temperature conditions to effect the desired extent of cracking thereof, passing the products from said cracking zone to a second separating zone to separate vapors from residue, passing the last mentioned vapors to said second fractionating zone for contact with the lighter condensate introduced thereinto, passing liquid residue from said first mentioned separating zone to a flashing zone under reduced pressure to separate a relatively heavy fuel oil from heavy flash distillate, and directing the heavy flash distillate to said first mentioned fractionating zone for contact with hot vapors therein to vaporize a part thereof, the unvaporized part thereof being passed through said viscosity breaking zone for further treatment along with unvaporized portions of the residual oil and heavy reflux condensate.

4. A process for converting higher boiling hydrocarbons into lower boiling hydrocarbons which comprises introducing crude petroleum residue into contact with vapors in a fractionating zone wherein fractionation takes place, passing resultant admixed heavy reflux condensate and unvaporized residue to a viscosity-breaking zone wherein the oil is subjected to cracking temperature and superatmospheric pressure under viscosity-breaking conditions to effect conversion into a relatively high yield of gas oil constituents adapted for conversion into gasoline, directing the resultant viscosity-broken products into a separating zone wherein vapors separate from residue, passing the separated vapors into said fractionating zone for contact with said introduced residue and for fractionating the vapors to form a lighter condensate comprising gas oil constituents, passing resultant residue from said separating zone to a vacuum flashing zone wherein the residue is subjected to distillation under subatmospheric pressure to form a heavy vacuum flashed distillate, introducing resultant heavy vacuum flashed distillate into said fractionating zone so that at least the heavier constituents thereof will be combined with the admixed heavy reflux condensate and unvaporized residue passed to the viscosity-breaking zone, introducing resultant lighter condensate comprising gas oil constituents from said fractionating zone into contact with vapors in a second fractionating zone wherein fractionation takes place to form a reflux condensate and a desired distillate product and wherein at least a portion of the constituents of the introduced lighter condensate is combined with said reflux condensate to form a part thereof, passing said reflux condensate to a cracking zone wherein it is subjected to cracking conditions of temperature and pressure to effect conversion into gasoline constituents, directing the resultant cracked products to a second separating zone wherein vapors separate from residue, and passing the separated vapors to said second fractionating zone for fractionation therein.

5. A process for converting higher boiling hydrocarbons into lower boiling hydrocarbons which comprises distilling crude petroleum to separate residual constituents from condensate constituents, subjecting residual constituents derived from the crude petroleum to cracking temperature and superatmospheric pressure in a viscosity-breaking zone under viscosity-breaking conditions to effect conversion into a relatively high yield of gas oil constituents adapted for conversion into gasoline, directing the resultant viscosity-broken products into a separating zone wherein vapors separate from residue, passing the separated vapors into a fractionating zone wherein fractionation takes place to separate heavier constituents from lighter constituents comprising gas oil constituents, directing said heavier constituents to said viscosity-breaking zone, passing residue from said separating zone to a vacuum flashing zone wherein the residue is subjected to distillation under sub-atmospheric pressure to recover heavy condensate constituents, combining resultant heavy condensate constituents with the aforesaid residual constituents for viscosity-breaking in said viscosity-breaking zone, combining condensate constituents from the crude petroleum distillation with lighter constituents comprising gas oil constituents from said fractionating zone and subjecting the mixture in a separate cracking zone to cracking conditions of temperature and pressure to effect conversion into gasoline constituents, directing the resultant cracked products into a second separating zone wherein vapors separate from residue, passing the separated vapors to a second fractionating zone wherein the vapors are fractionated to separate reflux condensate from a lighter distillate product and subjecting said reflux condensate to cracking in said separate cracking zone.

6. A process for converting higher boiling hydrocarbons into lower boiling hydrocarbons which comprises introducing crude petroleum residue into contact with vapors in a fractionating zone wherein fractionation takes place to separate a resultant mixture of heavy reflux condensate and unvaporized residue from lighter constituents comprising gas oil constituents, passing said mixture of heavy reflux condensate and unvaporized residue to a viscosity-breaking zone wherein it is subjected to cracking temperature and superatmospheric pressure under viscosity-breaking conditions to effect conversion into a relatively high yield of gas oil constituents adapted for conversion into gasoline, directing the resultant viscosity-broken products into a separating zone wherein vapors separate from residue, passing the separated vapors into said fractionating zone, passing resultant residue from said separating zone to a vacuum flashing zone wherein the residue is subjected to distillation under sub-atmospheric pressure to recover heavy condensate constituents, combining resultant heavy condensate constituents with the mixture of heavy reflux condensate and unvaporized residue for viscosity-breaking in said viscosity-breaking zone, subjecting a condensate comprising gas oil constituents to cracking conditions of temperature and superatmospheric pressure in a cracking zone to effect conversion into gasoline constituents, directing the resultant cracked products into a second separating zone wherein vapors separate from residue, passing the separated vapors to a second fractionating zone wherein the vapors are fractionated to separate heavier constituents from a lighter distillate product, combining resultant heavier constituents with gas oil constituents from said first fractionating zone and directing the resultant mixture to said cracking zone as the condensate being subjected to cracking therein.

CHARLES W. NOFSINGER.